(12) United States Patent
Sonnichsen et al.

(10) Patent No.: US 6,904,371 B2
(45) Date of Patent: Jun. 7, 2005

(54) METHOD AND APPARATUS FOR MEASURING ROTOR UNBALANCE

(75) Inventors: H. Eric Sonnichsen, Stow, MA (US); Borislav Milatovic, Hudson, MA (US)

(73) Assignee: Test Devices, Inc., Hudson, MA (US)

(*) Notice: Subject to any disclaimer, the term of this patent is extended or adjusted under 35 U.S.C. 154(b) by 0 days.

(21) Appl. No.: 10/426,246

(22) Filed: Apr. 29, 2003

(65) Prior Publication Data

US 2004/0034483 A1 Feb. 19, 2004

Related U.S. Application Data

(63) Continuation-in-part of application No. 10/252,960, filed on Sep. 23, 2002, now abandoned, which is a continuation of application No. 09/609,778, filed on Jul. 5, 2000, now Pat. No. 6,456,945, which is a continuation-in-part of application No. 08/953,259, filed on Oct. 17, 1997, now Pat. No. 6,098,022.

(51) Int. Cl.[7] .............................................. G06F 19/00
(52) U.S. Cl. ........................... 702/56; 702/35; 702/190
(58) Field of Search ........................... 702/33, 34, 183, 702/35, 56, 81, 189, 190; 73/460, 462, 664

(56) References Cited

U.S. PATENT DOCUMENTS

| | | | |
|---|---|---|---|
| 4,213,346 A | | 7/1980 | Polovnikov et al. |
| 4,380,172 A | | 4/1983 | Imam et al. |
| 4,408,294 A | | 10/1983 | Imam |
| 4,426,641 A | | 1/1984 | Kurihara et al. |
| 4,453,407 A | | 6/1984 | Sato et al. |
| 4,488,240 A | | 12/1984 | Kapadia et al. |
| 4,626,754 A | * | 12/1986 | Habermann et al. ........ 318/460 |
| 4,635,210 A | | 1/1987 | Shiohata et al. |
| 4,751,657 A | | 6/1988 | Imam et al. |
| 4,988,979 A | | 1/1991 | Sasaki et al. |
| 5,258,923 A | | 11/1993 | Imam et al. |
| 5,412,583 A | * | 5/1995 | Cameron et al. ........... 700/279 |
| 5,412,985 A | | 5/1995 | Garcia et al. |
| 5,533,400 A | | 7/1996 | Gasch et al. |
| 5,635,642 A | | 6/1997 | Nonomura et al. |
| 6,098,022 A | * | 8/2000 | Sonnichsen et al. .......... 702/35 |
| 6,456,945 B1 | | 9/2002 | Sonnichsen et al. |

FOREIGN PATENT DOCUMENTS

| | | |
|---|---|---|
| DE | 40 32 299 A1 | 4/1992 |
| DE | 44 06 723 A1 | 9/1994 |
| GB | 2 248 110 A | 3/1992 |

* cited by examiner

*Primary Examiner*—Bryan Bui
(74) *Attorney, Agent, or Firm*—Hamilton, Brook, Smith & Reynolds, P.C.

(57) ABSTRACT

A method and related system for measuring rotor unbalance comprises rotating a rotor about an axis at a range of rotating speeds; generating a reference signal indicative of the instantaneous rotational frequency of the rotor; detecting the vibration of the rotor while the rotator is rotating, and generating a vibration signal; filtering the vibration signal, using the reference signal, to provide a synchronous vibration signal having a frequency equal to the instantaneous rotational frequency of the rotor; recording a vibration vector, the vibration vector comprising amplitude and phase values for the synchronous vibration signal; and measuring rotor unbalance based upon the vibration vector. Measurement accuracy can be improved by recording vibration vectors for a plurality of rotations of the rotor, and determining an average vibration vector. Methods and systems for detecting a rotor anomaly are also disclosed.

14 Claims, 7 Drawing Sheets

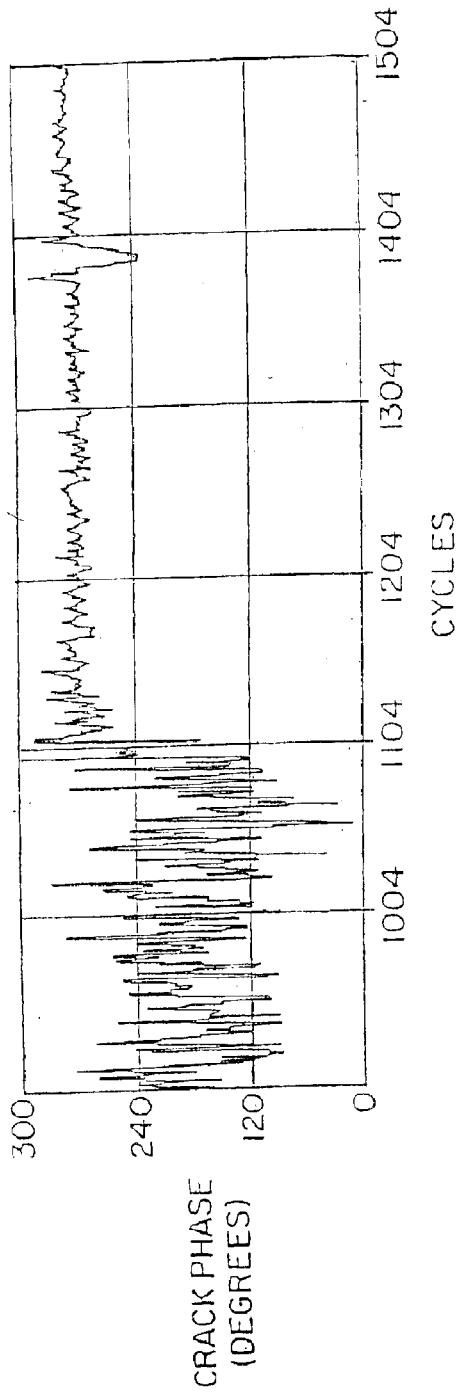
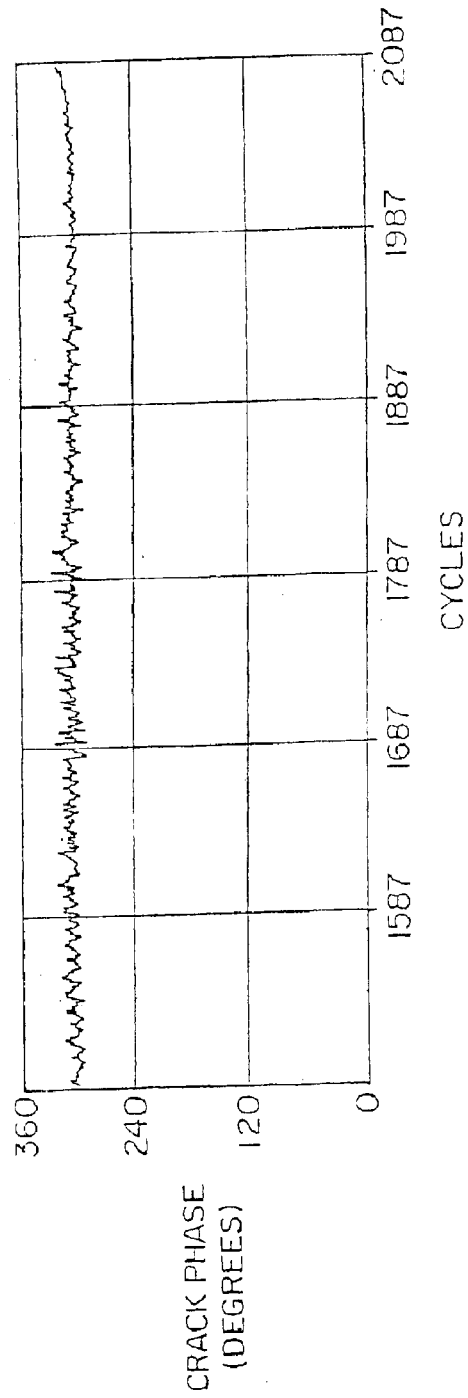

METHOD AND APPARATUS FOR MEASURING ROTOR UNBALANCE

RELATED APPLICATIONS

This application is a continuation-in-part of U.S. Ser. No. 10/252,960, filed Sep. 23, 2002, now abandoned which is a continuation of U.S. Ser. No. 09/609,778, filed Jul. 5, 2000, now U.S. Pat. No. 6,456,945 which is a continuation-in-part of U.S. Ser. No. 08/953,259, filed Oct. 17, 1997, now U.S. Pat. No. 6,098,022 the entire teachings of which are incorporated herein by reference.

BACKGROUND OF THE INVENTION

Rotating components used in jet engines and other high-speed machineries operate under large centrifugal stresses and can be fatigued through repeated use. For example, the Federal Aviation Administration (FAA) requires testing of newly-designed and revised engine hardware to establish life expectancy during the development phase of a new engine, and also when significant changes are made to an engine design.

Most jet engine manufacturers spend substantial time and money on computer simulations ("finite element models" of the engine hardware) to obtain an initial estimate of the safe operating life of an engine part. It is impossible, however, to determine a rotor's actual characteristics until it has been built and tested. Centrifugal fatigue life is generally measured at a centrifugal stress testing facility, in a spin test system designed to cycle the rotor from some low speed to operational speed then back again, alternately applying and relaxing the centrifugal stress.

Jet engines have numerous rotating parts that move and compress air (fans and impellers), or produce work (turbines). The elevated speeds at which these parts rotate induce high levels of centrifugal stress that tend to pull the components apart. A jet engine part such as a rotor usually fails in one of two ways. In the first failure mode, the rotor rotates to a speed that is sufficient to cause catastrophic material failure or burst. However, even when a rotor rotates at less than its burst speed, the rotor may eventually weaken over time as a result of many starts and stops. In this second failure mode, the part fatigues to a point where it develops a crack, which then grows to a critical size and ultimately causes the part to fail.

Typically, jet engine components such as rotors are thoroughly tested by the manufacturer as part of a development and qualification process to establish a safe operating life. The manufacturer will generally use a type of spin testing known as "fatigue life" testing. Fatigue life is measured in cycles, with a run up to operating speed and back down to zero or some lower speed being counted as one cycle. Each cycle corresponds roughly to one takeoff and landing of an aircraft. After the designer has measured the number of cycles a part can withstand before a fatigue burst happens, safety and performance factors can be developed and applied. The safety factor determines how many cycles can be tolerated by an engine before a part must be replaced. The safety margin is established cooperatively by the engine manufacturer and the appropriate governing safety authority, and it is intended to assure that parts are replaced before there is any chance of burst in the engine.

Jet engine rotors are also routinely subject to periodic inspection after installation to determine the health of the rotor. To inspect an installed rotor, the engine is taken apart and inspected with fluorescent penetrant, or inspected with eddy-current type crack probes. Moreover, methods are known for evaluating the health of a rotor by electronically monitoring vibrations. These methods generally measure broad-band vibration and infer the existence of problems when there is an overall increase in vibration amplitude. Other techniques are known as well, such as the method described in U.S. Pat. No. 4,751,657, to Imam et al. The method described in this patent uses changes in synchronous vibration as a function of speed to evaluate rotor health. Establishing safe operating component lives is a critically important process, since the fragments of a bursting rotor cannot be contained by the engine casing. A rotor burst in flight would probably destroy the aircraft. The air transport industry has achieved its admirable safety record due in no small way to spin-pit life testing of engine parts; still, there have been some tragic accidents in air transport due to rotor burst. Examples of accidents traced to fatigue failure include the DC-10 crash at Sioux City; the in-flight separation of a propeller blade in the crash of an EMB-120 Embraer near Carrollton, Georgia; and the fatal explosion of a fan disk assembly during take off of an MD-80 in Florida.

There is, therefore, still an unmet need for a technique which can accurately detect fatigue, cracks, and other anomalies in rotating components such as jet engine rotors and which is less cumbersome to use than penetrant or eddy current or other known techniques. Ideally, the technique could be used in a centrifugal spin testing facility used during engine qualification as well as for in-flight instrumentation which might continuously monitor the health of a jet engine.

SUMMARY OF THE INVENTION

Described herein is a system for monitoring a rotor, such as a rotor in an operating jet engine, to detect cracks or other potentially hazardous conditions. The system can be used with great accuracy and sensitivity, both to test a part in a centrifugal spin test facility as well as to test a part, in situ, during standard operation. Use of this system on an operating jet engine, or other machinery, can greatly reduce the risk of accidents, such as those described, above.

In one aspect, the system includes a vibration sensor for measuring the vibration of a rotor, a speed sensor for measuring the rotational speed and phase angle of the rotor, a filter coupled to both the speed sensor and vibration sensor, and a signal processor coupled to the filter and speed sensor. The filter, which can be a digital filter, extracts a signal from the vibration measurement having a frequency synchronous with the rotation of the rotor. The processor is programmed to subtract a background (or baseline) vibration signal from the synchronous vibration signal to produce a vibration difference signal. Each vibration signal exists in two separate parts, the vibration amplitude, and the vibration phase angle. These two separate parts are often combined for mathematical convenience as a "vector" (which in this context means a quantity with both magnitude and direction). The processor then measures and evaluates the vector representation of the vibration difference signal to determine if an anomaly, such as a crack, has developed.

In a preferred embodiment, the processor is programmed to evaluate the vibration difference vector amplitude by comparing it with the amplitude of a previous vibration difference vector to determine if the amplitudes are consistent. The processor evaluates the cycle-to-cycle change in the difference vector to determine whether the amplitude and/or rate of change of amplitude exceeds a preset triggering limit. A crack is detected when the triggering limit is exceeded.

In a further preferred embodiment of the system, the rotor is a component of a jet engine on an aircraft.

A method of this invention may be broken down, as follows. The rotational speed and vibration of a rotor are measured. From the vibration measurement, a synchronous vibration signal having a frequency matching the frequency of rotation is filtered. A baseline vibration vector is subtracted from the synchronous vibration signal to produce a vibration difference signal. The amplitude, and also the phase, of the vibration difference signal is then measured and evaluated to determine whether an anomaly, such as a crack, has developed. In a preferred embodiment of the method, the steps of the above-described method are repeated and vibration is measured while the rotor is accelerating or decelerating.

In another embodiment of the method of the invention, a mechanical component is rotated about an axis at a range of rotating speeds. A vibration signal value of the mechanical component is detected while the mechanical component is rotating. This vibration signal value is detected independently of whether, or at what rate, the mechanical component is accelerating or decelerating.

In yet another embodiment, a method and related system for measuring rotor unbalance, such as rotor unbalance resulting from a crack or other anomaly, comprises rotating a rotor about an axis at a range of rotating speeds; generating a reference signal indicative of the instantaneous rotational frequency of the rotor; detecting the vibration of the rotor while the rotator is rotating, and generating a vibration signal; filtering the vibration signal, using the reference signal, to provide a synchronous vibration signal having a frequency equal to the instantaneous rotational frequency of the rotor; recording a vibration vector, the vibration vector comprising amplitude and phase values for the synchronous vibration signal; and measuring rotor unbalance based upon the vibration vector. Measurement accuracy can be improved by recording vibration vectors for a plurality of rotations of the rotor, and determining an average vibration vector.

BRIEF DESCRIPTION OF THE DRAWINGS

FIG. 4 is a graph of crack phase corresponding to the measurements charted in FIG. 2.

FIG. 5 is a graph of crack phase corresponding to the measurements charted in FIG. 3.

DETAILED DESCRIPTION OF PREFERRED EMBODIMENTS

Figure 1A:
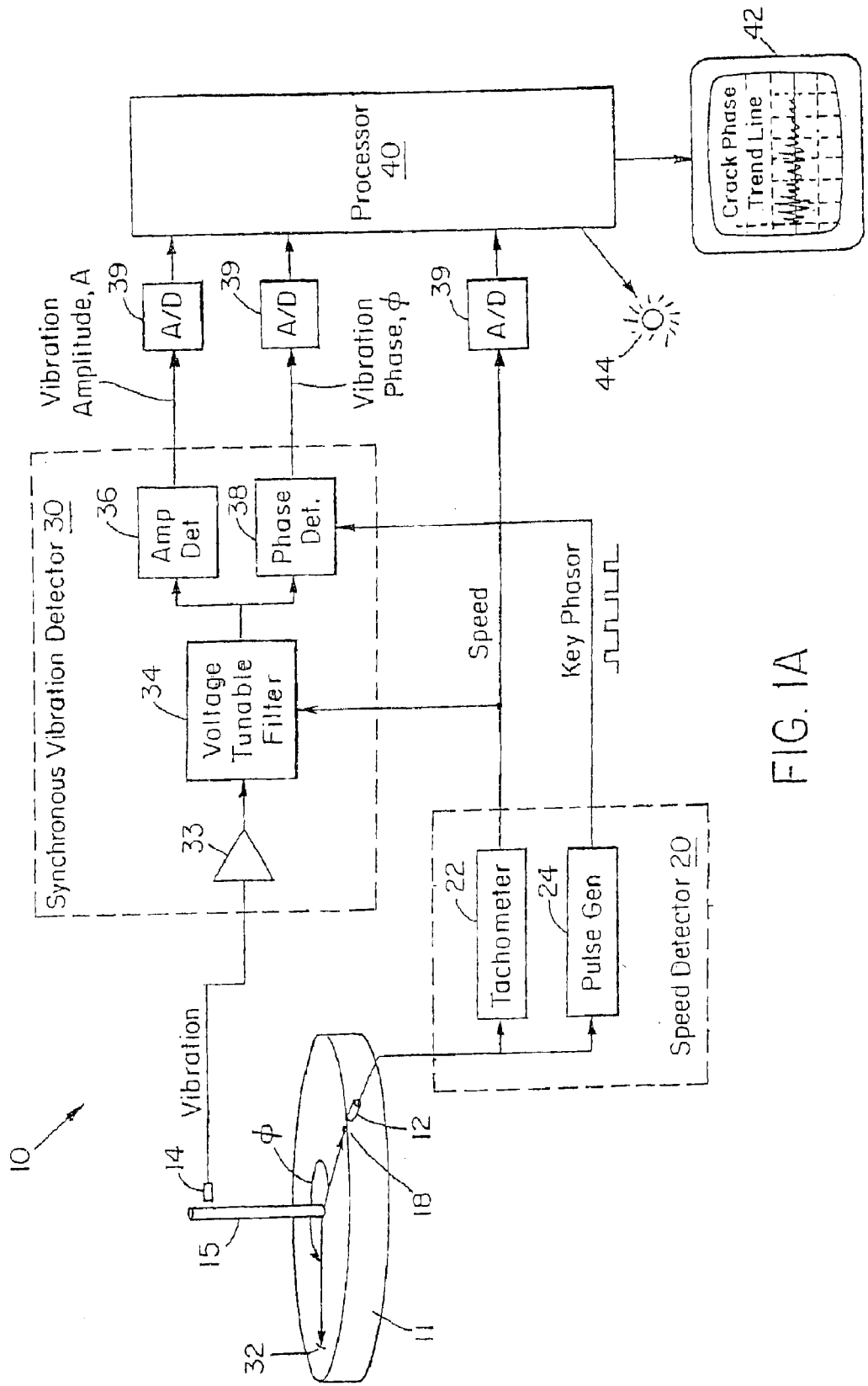
FIG. 1A is a block diagram of the components of one embodiment of a system for monitoring a rotor

FIG. 1A is a block diagram of the components of a system for detecting attributes of anomalies 32 such as cracks formed in a rotating component 11. The system 10 includes a reference signal transducer 12, a vibration transducer 14, a speed detector 222, a synchronous vibration detector 30, one or more analog to digital (A/D) converter 39, a processor 40, a display 42 and an indicator 44.

The rotating component 11 may be a rotor of a jet engine, which may include a turbine blade, a flywheel, or other mechanical component subject to fatigue, cracks and other anomalies which eventually lead to catastrophic failure.

The reference signal transducer 12 is positioned in radial alignment with a circumferential surface of the rotating component 11 or other component of the rotating assembly. The reference signal transducer 12 is typically a variable reluctance sensor probe such as model M3010 manufactured by Electro Corporation of Sarasota, Fla. The output of the reference signal transducer 12 is provided to a tachometer 22 and pulse generator 24.

The tachometer 22 operates on the signal provided by the reference signal transducer 12, monitoring it over time to determine the rotational speed of the component 11 such as measured in revolutions per minute. The tachometer 22 then generates a speed signal that is forwarded to the synchronous vibration detector 30 and analog to digital converter 39. A tachometer 22 suitable for use in this application is the model 1150 manufactured by Test Devices, Inc. of Hudson, Mass.

The pulse generator 24 provides a short duration pulse signal having a rising edge at precisely the same point of each revolution of the component 11. The pulses generated form a key phasor signal having a rising edge each time that a reference point 18 of the component 11 passes by the reference signal transducer 12. The key phasor signal is therefore a series of pulses indicating at points in time which the component 11 is at a known position. The key phasor signal is provided to the phase detector and also provided to the synchronous vibration detector 30.

The vibration transducer 14 is radially aligned with the axis of rotation of the component 11 such as its central shaft 15. The vibration transducer 14 is typically an eddy current type probe which generates a continuous voltage indicative of a vibration measurement. One suitable vibration transducer 15 is the model number VM-14S1 manufactured by Shinkawa Electric Co., Ltd. of Chicago, Ill. and associated VK-202A-2 transducer driver. However, if a rotor is monitored while in normal use, the central shaft may not be accessible. Under these circumstances, force upon the bearing casing can be measured using an accelerometer to indicate vibration. The raw vibration signal produced by the vibration transducer 14 is provided to the synchronous vibration detector 30.

The synchronous vibration detector 30 includes a pre-amplifier 33, a voltage tuneable filter 34, an amplitude detector 36, and a phase detector 38. The synchronous vibration detector 30 operates on the vibration signal, speed signal, and key phasor to provide a vibration vector in the form of vibration amplitude signal and a vibration phase signal.

More particularly, the pre-amplifier 33 provides appropriate buffering of the signal output by the vibration transducer 14 prior to forwarding it to the voltage tuneable filter 34.

The voltage tuneable filter 34 receives the vibration signal as well as the speed signal to selectively extract certain components of the vibration signal. The signal components extracted are those which are synchronized with the instantaneous rotating frequency of the component 11. Other components of the vibration signal are rejected by the voltage tuneable filter 34. In other words, the voltage tuneable filter 34 selects only those vibrations with frequencies matching the instantaneous frequency of rotation of the component 11 for further processing. The voltage tuneable filter 34 may, for example, be a model number FLJ-VD bandpass filter available from Datel, Inc. of Mansfield, Mass. In effect, the voltage tuneable filter acts as a bandpass filter to select only the components of the vibration signal equal to the current rotation speed frequencies as indicated by the tachometer 22.

As a result of the operation of the voltage tuneable filter 34, the system 10 provides an advantage over similar prior art systems in that it is able to measure the growth of anomalies 32 such as cracks and migration in their position while the rotating component 11 is operating in any mode, and not just at a constant rotational speed. As a result, the normal operation of a machine under test, such as a jet engine, need not be interrupted to perform an evaluation of the relative health of the component 11. Rather, the initiation of a crack or other anomaly 32 may be detected and its growth observed even while component 11 is under normal operation, or even when cycled under high rates of acceleration and deceleration during a test mode in a spin pit.

The output of the voltage tuneable filter 34 is thus an analog voltage indicative of the vibration signal components at the current speed.

This synchronously filtered vibration signal is then forwarded to the amplitude detector 36 and phase detector 38. The filtered vibration signal at this point is typically a sinusoidal waveform where its amplitude represents the amplitude of the synchronous vibration of the component 11, and where in phase is a relative measurement of the angular location of the vibration anomaly relative to the reference point 18.

Therefore, the amplitude detector 36 processes the filtered vibration signal by an amplitude measuring circuit that provides a direct current (DC) voltage proportional to the amplitude.

The filtered vibration signal is processed at the same time by the phase detector circuit 38, which compares the phase of the filtered vibration signal to the key phasor signal, in order to develop a voltage output indicative of the angular location, $\phi$, of the anomaly 32. The phase detector circuit 38 thus provides an accurate indication of the relationship between the phase of the filtered vibration signal and the reference signal provided by the transducer 12.

The output of the synchronous vibration detector 30 is thus a pair of DC voltages representing the vector amplitude and phase of the filtered synchronous vibration, in real time, of the component 11.

The vibration amplitude voltage, A, and vibration phase voltage, $\phi$, are fed together with the speed voltage to the A/D converters 39. Each of these voltages may be processed by respective A/D converter 39 or a single A/D converter 39 may be time-multiplexed among the three signals.

The converted analog voltages are then provided to the processor 40. The processor 40 performs a number of steps in order to further discern speed-dependent changes in the vibration measurements. In particular, the processor 40 acts as a form of sample and hold device that ensures that vibration amplitude and phase is acquired at the same speed of rotation of the component 11, such as when it crosses through desired triggering speed in a given operating cycle. In a jet engine, for example, the speed of a rotor component 11 may cross a triggering speed each time the aircraft takes off and lands, accelerating through the former and decelerating through the latter.

The processor 40 preferably takes advantage of the fact that the vibration amplitude A and vibration phase $\phi$ can be mathematically expressed as a vector. By recording this vector during a baseline measurement process and then comparing subsequently measured vectors during cycling of the component 11, a difference vector may be developed which represents actual change in vibration due to the presence of later developed anomalies 32. The baseline measurement is typically taken while the component 11 is in a known state, such as when it is new and having no known anomalies. Once this difference vector differs in magnitude or phase, or exhibits other changed characteristics, the processor 40 may provide an indication via the display 42 or other indicator 44 of either the history of the vibrations due to the anomaly 32 and/or an indication that the component 11 is entering a critical state prior to failure.

Figure 1B:
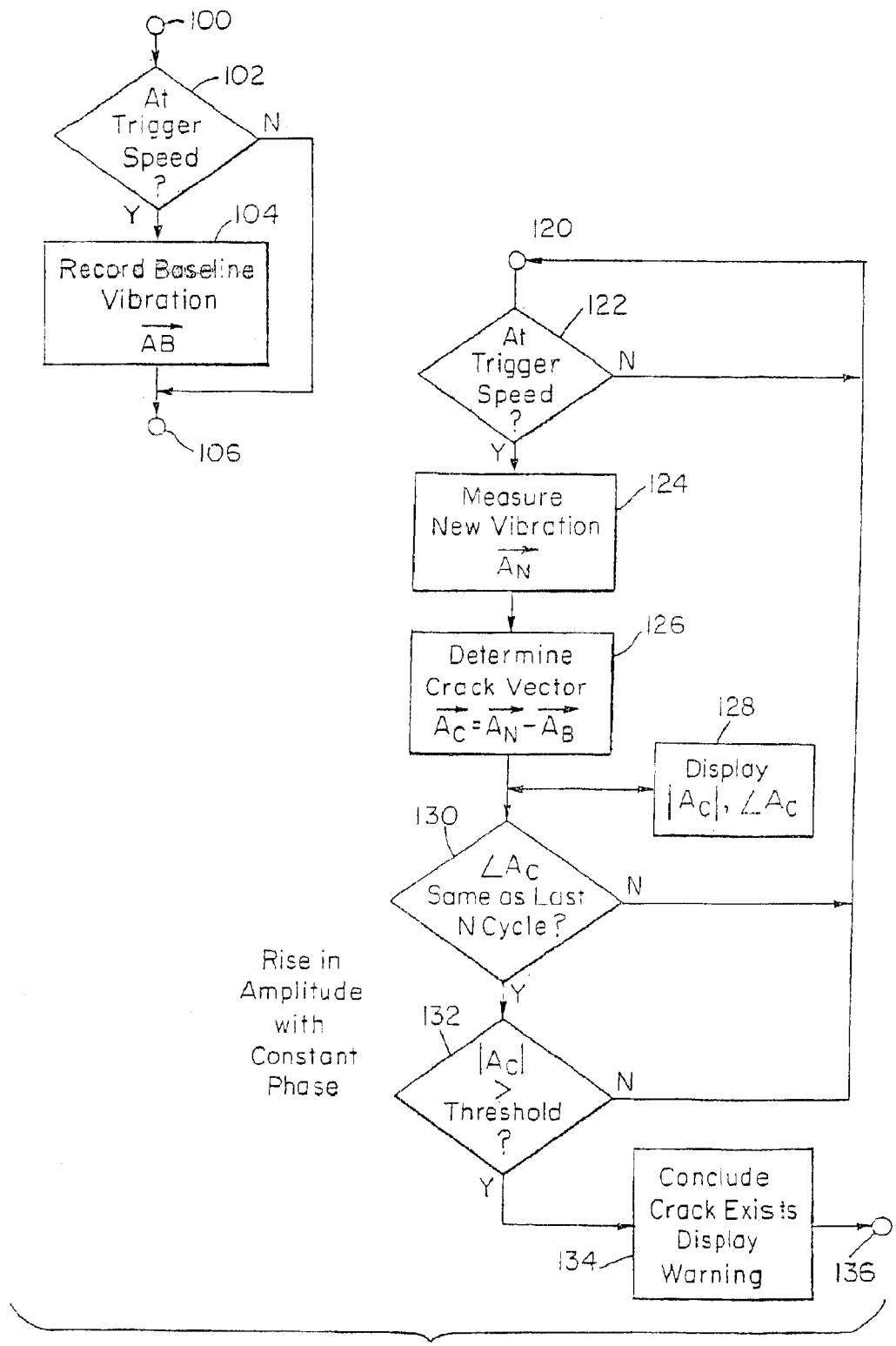
FIG. 1B is a flow chart of the sequence of steps performed by the processor shown in FIG. 1A.

The sequence of these steps as performed by the processor 40 is detailed in FIG. 1B. From an idle or otherwise unrelated operating state 100, the processor 40 enters a state 102. State 102 is typically entered during a calibration or baseline sequencing for the device 11 such as during initial installation or at another time when the component 11 is known to be in known good condition. In state 102, the speed value as provided by the tachometer 22 and A/D converter 39 is compared against a trigger speed. If the speed of the component 11 is not at the trigger speed, that is it is either rotating at a slower speed or a faster speed, then processing continues to a later state 106. However, if the speed is at the trigger speed, then a state 104 is entered in which a baseline vibration vector AB is recorded. The vector $A_B$ records the vibration amplitude A and vibration phase $\phi$ observed at the trigger speed. Processing then continues to state 106 in which the processor 40 may perform other tasks.

The processor eventually reaches a state 120 such as performed during a test sequence or during normal operation of the component 11 such as during a takeoff or landing of the aircraft. From the state 120 a state 122 is entered in which the speed signal is again measured to determine if it is at the trigger speed. If this is not the case, then processing returns to 120 where the processor 40 may perform other tasks.

If, however, the component 11 is presently rotating at the trigger speed, then a state 124 is entered. In this state a new vibration vector $A_N$ is determined by again measuring the vibration amplitude, A, and vibration phase, $\phi$.

Processing then proceeds to the next step 126 in which a crack vector $A_C$ is determined from the relationship:

$$A_C = A_N - A_B$$

The crack vector, $A_C$, therefore represents the difference between the most recently measured vibration at the trigger speed and the baseline vibration. This vector difference therefore represents only the amount of vibration produced by the anomaly 32 (referred to herein as the anomaly vibration).

The processor 40 may then perform a number of steps to permit further evaluation of the anomaly vibration in a number of ways. For example, the processor 40 may enter a state 128 in which a display of the amplitude and phase of the crack vector $A_C$ is presented typically on a per cycle basis. This display may be provided on a visual output device such as a cathode ray tube display 42, a printer, or other output device.

Alternatively or additionally, processor 40 may proceed to a state 130 in which the processor compares the value of consecutive crack vector phase measurements to determine if the phase is remaining relatively consistent. If this crack vector phase has remained consistent over a series, such as N, prior cycles, then this is an indication of an anomaly 32 developing. If, however, this phase difference is not the same over a series of prior measurements then it is presumed that any such differences are noise, and defined anomalies are not occurring. Therefore, processing may continue back to state 120.

Once a constant phase of the crack vector $A_C$ has been observed then a state 132 is entered in which the amplitude portion of the anomaly vibration vector is determined. If this amplitude is not greater than a threshold amount, indicating an acceptable condition, processing returns to state 120.

If, however, a crack has developed in the rotating component 11, a significant distortion of the symmetry of the strain field in the device produces a proportional change in the mass distribution, therefore unbalancing it in measurable way. This is indicated by the amplitude of the vector $A_C$ exceeding a predetermined threshold.

In this instance, a state 134 is entered in which it is concluded that a crack or other anomaly 32 exists. At this point the presence of the anomaly 32 may be announced by activating an indicator 44. If associated with a device under test such as a jet engine, the indicator 44 may be provided in an engine compartment such as in a position to be noticed the next time the aircraft lands for servicing in other applications the indication may be provided on a display to an operator of the aircraft.

The processor then returns to a state 136 in which further processing relevant to having detected an unacceptable level of anomaly 32 in the rotating component 11. For example, the processor 40 at this point may provide other signals to a drive shaft of the component 11 to halt its rotation.

We have determined that the principles of the foregoing system hold true for a variety of different type of anomalies 32. For example rim, bore and blade cracks of a jet engine rotor each produce measurable imbalance changes. Rim cracks produce less distortion of mass distribution but are located at a relatively large radius and therefore produce significant imbalance. Bore cracks on the other hand are typically located at a small radius. However, because of relatively high stress in a bore crack, the bore cracks produce very significant mass distribution changes. Blade cracks often produce a small crack amplitude rating compared to rim and bore cracks but their phase indication is definitive.

The crack induced redistribution of the mass of the rotating component 11 therefore causes an anomaly vibration that can be synchronously detected as described above. Because the amplitude of the anomaly vibration increases as the crack develops, the existence of any of various types of cracks can be detected by monitoring the amplitude of the anomaly of the vibration and/or its phase, even during normal acceleration and deceleration cycling of the component 11.

Figure 1C:
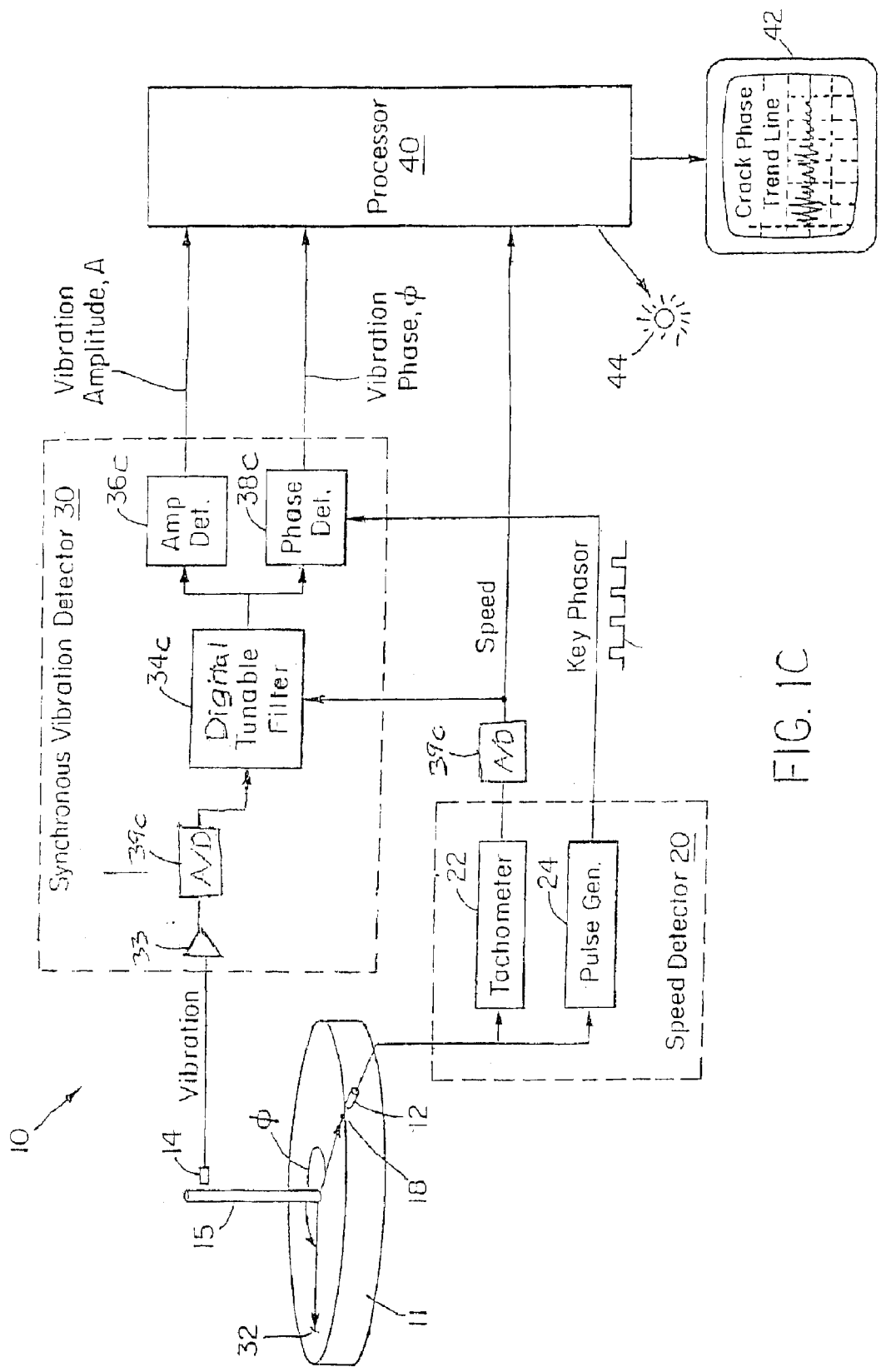
FIG. 1C is a block diagram of an alternative embodiment of a system for monitoring a rotor.
Figure 2:
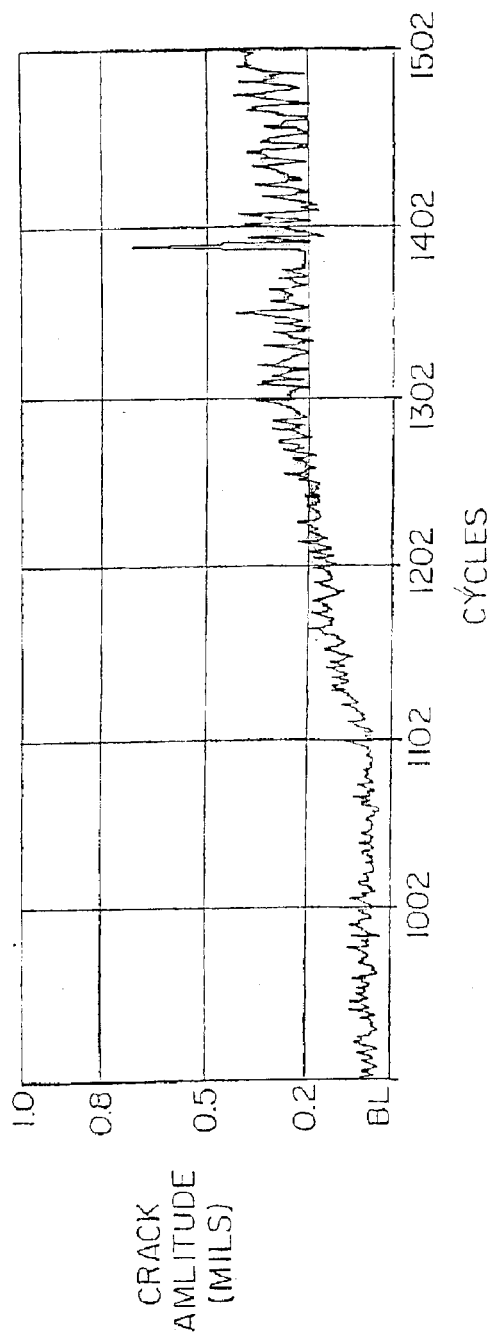
FIG. 2 is a graph of crack amplitude in a rotor versus cycle, as described in the exemplification entitled, "Example I," infra.
Figure 3:
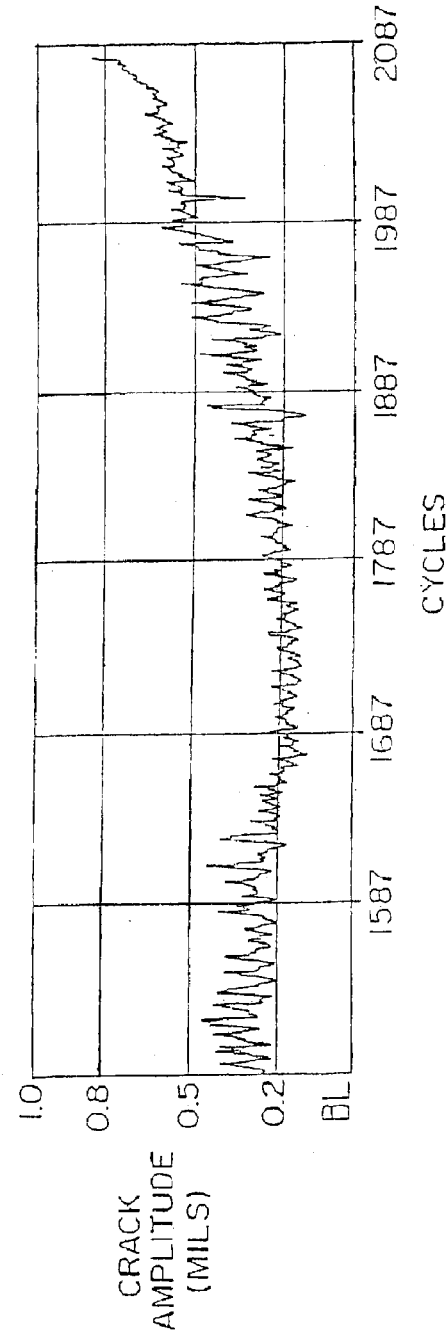
FIG. 3 is a graph of crack amplitude over the final cycles of the test charted in FIG. 2.

FIG. 1C is a block diagram of an alternate embodiment of the synchronous vibration detector 30. This embodiment makes use of a digital filter to perform the function of the voltage tuneable filter 34 in the embodiment previously described in FIG. 1A. In particular, the vibration signal is still fed to an amplifier 33. However, in this embodiment, the vibration signal is first converted to a digital signal by the A/D converter 39c. This digital vibration signal is then fed to a digital filter 34c, having its center frequency tuneable by the speed signal. The digital tuneable filter 34c provides digital filtered signal to the amplitude detector 36c and phase detector 38c. Of course, in this embodiment, the amplitude detector 36c and phase detector 38c are also digital implementations of the analog circuits previously described.

The key phasor signal is also fed to the phase detector 38c as in the previously described analog embodiment. The output of this embodiment of the synchronous vibration detector 30 is fed to the processor 40 as in the FIG. 1A embodiment previously described. It should be understood that the digital tuneable filter 34c can be implemented using any number of known techniques for implementing digital filters. For example, it may be implemented as a finite impulse response (FIR) type digital filter or using fast Fourier transforms (FFTs) or other known digital filtering techniques.

EXEMPLIFICATION

The performance of the crack detection system has been demonstrated in many different testing applications. Without exception the system has given excellent results with various rotating part configurations and with different materials, including both metals and composites. The system has successfully detected cracks and crack propagation on carbon fiber composites used for energy storage flywheels, on bladed turbine assemblies, a second stage compressor rotor for a jet engine, a bladed fan disk, medical centrifuges, and numerous other rotors.

Example I

High-Pressure Turbine (Bladed Disk Assembly)

An example application is shown in FIGS. 2–5. This was a low-cycle fatigue test for life certification of a bladed turbine assembly for a jet engine gas generator. The disk was about eight inches in diameter and weighed 15 pounds (lbs.). The test specification called for 30,000 cycles between minimum and maximum speeds of 2,500 revolutions per minute (RPM) and 48,000 RPM. The crack detection system monitored the vibration and crack development. Through 25,000 cycles (1100 on FIG. 2), the system indicated an insignificant crack amplitude, and the crack phase was random (see FIG. 4), a clear indication that no crack has been detected. Beyond 25,000 cycles the initiation of a crack is indicated, as demonstrated by the trend of the crack amplitude (see FIGS. 2 & 3) and crack phase curves (see FIGS. 4 & 5).

As the amplitude of the crack grew, the phase stabilized around a particular angle. During the next 1000 cycles the crack propagation continued, confirmed by the crack amplitude and phase stability trend. At 25,987 cycles (2087 on the graph in FIG. 3), the crack amplitude grew to 0.83 mils, which exceeded the alarm level set at 0.8 mils, and shut down the test (note: the crack amplitude is a relative indication of crack size compared to a previously set baseline, not an absolute indication). The alarm level was reset and the test was continued. The next cycle indicated 0.96 mils of crack amplitude, and the disk burst on the following cycle.

In this test, the crack detection system successfully detected and tracked the primary crack in this rotor for the last 990 cycles. In the next example the system detects and tracks a series of cracks in another bladed disk assembly for more than 17,000 cycles.

Example II

Power Turbine (Bladed Disk Assembly)

In this example, a low-cycle fatigue test was performed on a series of power turbine disks. The test was performed in a degraded vacuum which eliminated fretting as an issue during the spin test. A number of tests were run and different failures were recorded and observed with the crack detection system as discussed below.

Figure 6:
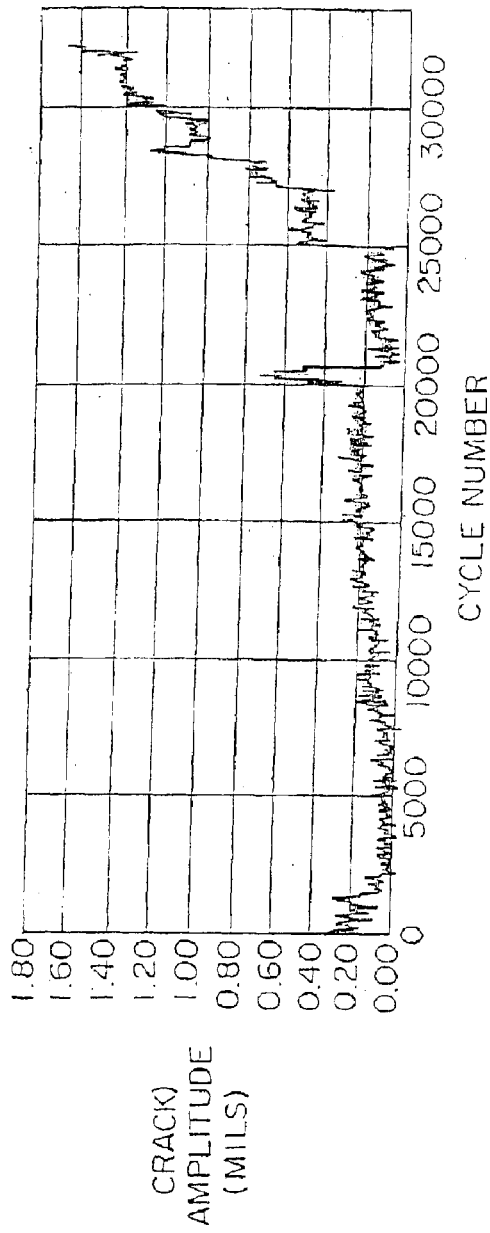
FIG. 6 is a graph of crack amplitude versus cycle, as described in the exemplification entitled, "Example II," infra.
Figure 7:
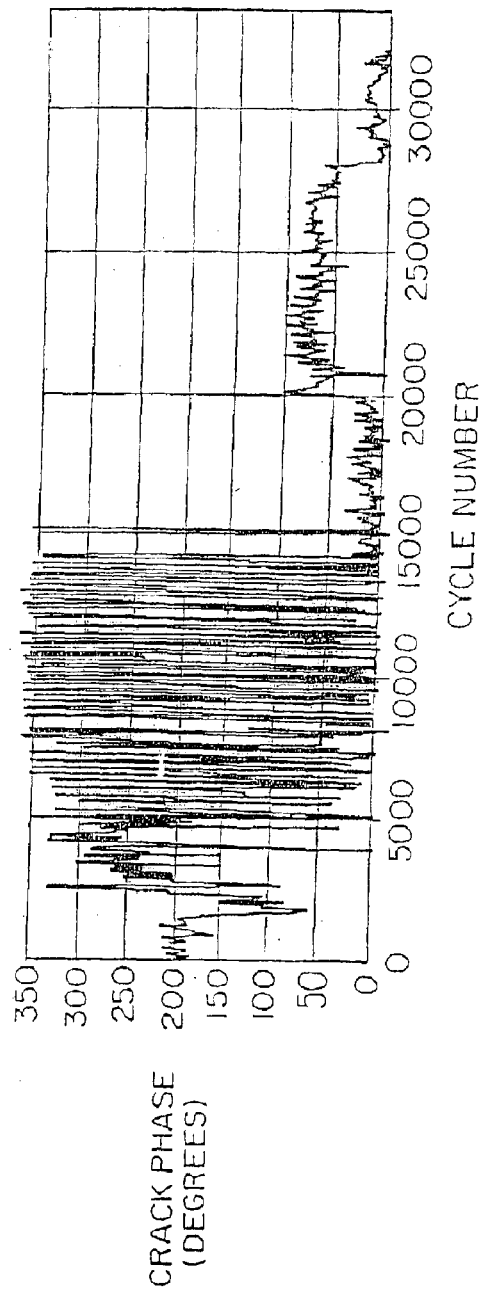
FIG. 7 is a graph of crack phase corresponding to the measurements charted in FIG. 6.

FIG. 6 is a plot of crack amplitude for one of the power turbine disks. This disk developed cracks in blade tenons. At test termination (approximately 32,000 cycles) this disk had 16 cracks approximately 0.200 inches in size. The crack detection system successfully picked up the initial crack and was able to track crack growth through multiple crack initiations for more than 17,000 low-cycle-fatigue cycles. FIG. 7 shows the phase plot of the crack detection system for this test. It is clear from the undulations in the graph that past cycle 15,000 the system is tracking multiple cracks, growing at different rates.

Improvements To Measurement Accuracy Via Vector Averaging

As described above, "synchronous vibration" is a two-dimensional quantity, conventionally represented as a vector, with both amplitude and phase angle. The "amplitude" of the vibration vector is the amplitude of the filtered synchronous vibration waveform. The "phase angle" of the vibration vector is defined as the angle between some fixed radial line on the balancing apparatus and a fixed radial line on the rotor, at the instant the amplitude of the synchronous vibration vector passes through zero in the direction of amplitude increase.

There are several important sources of error in the measurement of the synchronous vibration vector, including, for example:
1. Electrical noise;
2. Errors in phase measurement timing;
3. Errors in shaft motion from bearing clearance;
4. Errors in amplitude measurement; and
5. Filter bleed-through.

These and other random errors can be greatly minimized or eliminated entirely by recording a plurality of synchronous vibration vectors (i.e. amplitude and phase), and calculating the vector average of this data set.

It should be noted that vectors cannot be averaged by taking the average of phase and the average of amplitude separately and taking the average phase and amplitude as the average vector. A clear example of this is shown by calculating the average of the following three vectors:

| Vector | Amplitude | Phase |
|--------|-----------|-------|
| 1 | 3 | 0 |
| 2 | 4 | 200 |
| 3 | 1 | 90 |

The average Amplitude of the above set is 8/3=2.67. The average Phase of the above set is 96.7.

These values do not represent the vector average of the three vectors. In order to find the true average, the vector sum of the three vectors must be calculated. The average of the vectors is a vector whose amplitude is the amplitude of the sum divided by the number of vectors in the set, and whose angle is the same as the vector sum. For example:

| Vector | Amplitude | Phase | X | Y |
|--------|-----------|-------|-------|-------|
| 1 | 3 | 0 | 3 | 0 |
| 2 | 4 | 200 | -3.759 | -1.368 |
| 3 | 1 | 90 | 0 | 1 |
| Sum | | | -0.759 | -0.368 |

Amplitude of the sum=0.843
Phase of the sum=205.8 degrees
Amplitude of the average=0.843/3=0.281
Phase of the average=205.8 degrees Note that the average vector is very different from the vector improperly calculated by averaging the individual amplitudes and individual phases as shown above.

An example of a system and method for measuring rotor unbalance which utilizes vector averaging will now be described, with reference to FIG. 1A. A rotor 11 to be evaluated is mounted in bearings and driven to some convenient speed, either above or below the resonant frequency (determined by the rotor and bearing stiffness). A special balancing apparatus can be used, or the rotor can be operated in its own bearings. A vibration measuring instrument, such as vibration transducer 14, is used to acquire a broad-band vibration signal from the rotor. In addition, an angular position sensing instrument, such as reference signal transducer 12, is used to create a phase reference signal at the same angular position at each revolution of the rotor. The phase reference signal can be connected to an edge detector/pulse shaper, such as pulse generator 24, to produce a very narrow pulse that occurs at precisely the same instant that the rotor passes through the zero reference phase angle.

The synchronous vibration detector 30 preferably includes a narrow-band, voltage-tuneable filter 34 which processes the vibration signal (optionally amplified by pre-amplifier 33) and passes only the synchronous portion of the vibration waveform produced by the unbalance of the rotor. The phase reference signal from transducer 12 is used to produce a voltage signal that is proportional to the frequency of rotation (such as via tachometer 22). This frequency-proportional voltage is connected to the control input of the voltage-tuneable filter 34 to set the filter center frequency at the instantaneous frequency of rotation of the rotor being measured. The phase reference signal is also provided to the phase detector 38. The amplitude detector 36 and phase detector 38 operate on the synchronous vibration signal to provide a vibration vector in the form of an amplitude vibration signal and vibration phase signal. These signals can be digitized, and recorded and/or displayed by processor 40.

In alternative embodiments, such as shown in FIG. 1C, the vibration signal can first be converted to a digital signal, and digitally processed by synchronous vibration detector 30 employing a digital filter and related digital circuits.

According to one aspect, the processor 40 can be programmed to record the vibration vector values (amplitude and phase) for each of a series of revolutions of the rotor, and to determine the vector average of this data set. The number of revolutions can be chosen as appropriate to the rotation rate of the rotor and the speed with which the calculation needs to be done. In a typical case, the number of revolutions will be about 100. By calculating the vector average of the data set, random measurement errors can be reduced by a factor approximately equal to the reciprocal of the number of revolutions included in the average. For example, with 100 revolutions, the error term will be approximately 1 percent of the error of any individual measurement.

Figure 8:
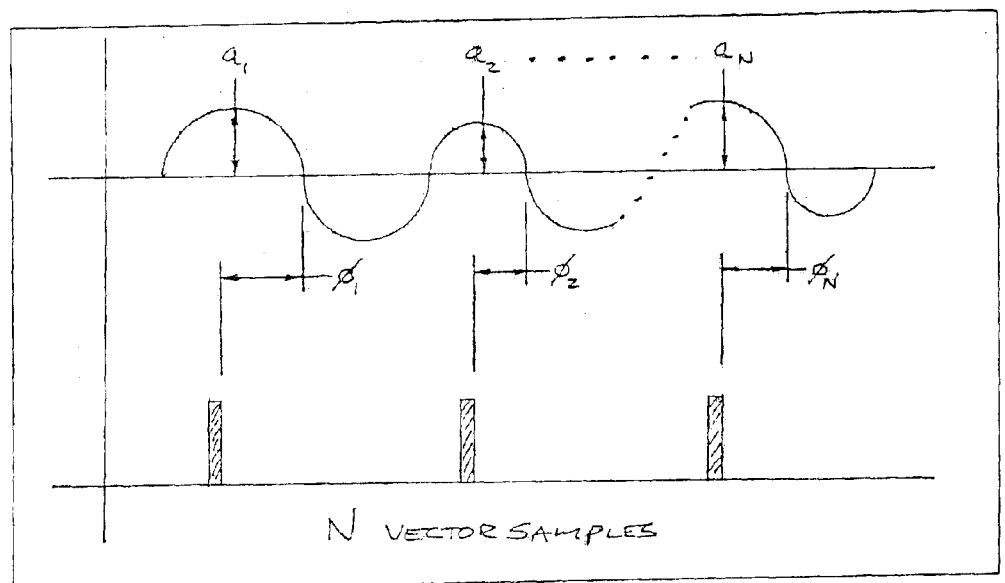
FIG. 8 is a plot of the synchronous vibration signal and phase reference signal for a series of rotations of the rotor.

An example of a vector averaging method will now be described with reference to FIG. 8. In general, the rotor is accelerated or decelerated through a trigger speed threshold. The rotor rotates on an axis for N revolutions, producing a continuous synchronous vibration signal as shown in FIG. 8. A phase reference signal is also generated once per revolution when the rotor is in a known position, and is used to determine the phase of vibration signal. The amplitude and phase of the synchronous vibration signal are recorded N times (once per revolution), to produce an array of vector samples, 3 wide and N deep:

| Index (i) | Amplitude (mils) | Phase (degrees) |
|---|---|---|
| 1 | $a_1$ | $\theta_1$ |
| 2 | $a_2$ | $\theta_2$ |
| 3 | $a_3$ | $\theta_3$ |
| — | — | — |
| — | — | — |
| n | $a_n$ | $\theta_n$ |

Typically, there will be about 100 samples in a data set, but the number of samples per set can be changed by a menu selection. The vector set is averaged by calculating the x and y components each vector, where $x_i = a_i \cos\theta_i$ and $y_i = a_i \sin\theta_i$, to produce the 5×N array illustrated below:

| Index (i) | Amplitude (mils) | Phase (degrees) | X(i) | Y(i) |
|---|---|---|---|---|
| 1 | $a_1$ | $\theta_1$ | $x_1$ | $y_1$ |
| 2 | $a_2$ | $\theta_2$ | $x_2$ | $y_2$ |
| 3 | $a_3$ | $\theta_3$ | $x_3$ | $y_3$ |
| — | — | — | — | — |
| — | — | — | — | — |
| n | $a_n$ | $\theta_n$ | $x_n$ | $y_n$ |

The x components and y components are then summed to produce:

$$X = \sum_{1 \to n} x_i$$

; and $$Y = \sum_{1 \to n} y_i$$

The amplitude of the vector sum is thus: $A_{(sum)} = (X^2 + Y^2)^{1/2}$. The average vector amplitude, $A_{(avg.)}$, can then be determined by dividing the amplitude of the sum by the number of vectors in the set, or $A_{(avg.)} = 1/n^* (X^2+Y^2)^{1/2}$.

The phase angle of the vector average is the same as the phase angle of the vector sum. Thus:

$\theta_{(avg.)} = \cos^{-1} (X/A_{(sum)})$, if Y>0, and $\theta_{(avg.)} = 2\pi - \cos^{-1} (X/A_{(sum)})$, if Y <0.

If Y=0, then the phase angle is 0° if X is positive, and 180° if X is negative.

The vibration vector data can be used by processor 40 to determine the existence and location of rotor cracks or other anomalies, to calculate the amount and location of any correction weights needed to reduce the unbalance of the rotor, or it can be used to indicate changes of unbalance over time, to monitor degradation of the rotor from cracking, erosion, or other causes.

EQUIVALENTS

While this invention has been particularly shown and described with references to preferred embodiments thereof, it will be understood by those skilled in the art that various changes in form and details may be made therein without departing from the scope of the invention as defined by the appended claims. For example, the apparatus and method can be used to detect not only cracks within the structure, but also other mechanical anomalies, such as a loose bolt within the structure. Although much of the description is directed toward the testing of jet engine rotors, the method and apparatus of this invention can also be used to monitor other rotating machinery, such as energy-storage flywheels, turbines for power generation and medical centrifuges.

The invention claimed is:

1. A method for measuring rotor unbalance, comprising:
    rotating a rotor about an axis at a range of rotating speeds;
    generating a reference signal indicative of the instantaneous rotational frequency of the rotor;
    detecting the vibration of the rotor while the rotator is rotating, and generating a vibration signal;
    filtering the vibration signal, using the reference signal, to provide a synchronous vibration signal having a frequency equal to the instantaneous rotational frequency of the rotor;
    recording a vibration vector, the vibration vector comprising amplitude and phase values for the synchronous vibration signal; and
    measuring rotor unbalance based upon the vibration vector.

2. The method of claim 1, further comprising:
    recording a plurality of vibration vectors, each vector corresponding to one of a plurality of revolutions of the rotor; and
    determining an average vibration vector from the plurality of recorded vectors.

3. The method of claim 2, wherein determining an average vibration vector comprises:
    calculating x and y components for each recorded vector, wherein the x-component of each vector comprises the amplitude of the vector multi the cosine of the vector phase angle, and wherein the y-component of each vector comprises the amplitude of the vector multiplied by the sine of the vector phase angle;
    determining the sums of the x and y components of the recorded vectors to produce x and y component sums, X and Y;
    determining an average amplitude value from the x and y component sums, where the average amplitude, A(avg.), is $1/n^*(X2+Y2)^{1/2}$, where n is the number of recorded vectors; and
    determining an average vector phase angle value from the x and y component sums, where the average vector phase angle is $\cos-1 (X/[X2+Y2]^{1/2})$, where Y $ 0, and $2B-\cos-1(X/[X2+Y2]^{1/2})$, where Y<0.

4. The method of claim 2, wherein at least about 100 vectors are recorded.

5. The method of claim 1, further comprising determining a location for and amount of correction weights to be added to or removed from the rotor to reduce the detected rotor unbalance.

6. The method of claim 1, wherein measuring rotor unbalance comprises determining the existence and location of a rotor anomaly.

7. The method of claim 6, wherein the anomaly comprises a crack.

8. An apparatus for measuring rotor unbalance, comprising:
- a vibration sensor which measures the vibration of the rotor while the rotor is rotating, and generates a vibration signal;
- a speed sensor which generates a reference signal indicative of the instantaneous rotational frequency of the rotor;
- a filter which filters the vibration signal, using the reference signal, to provide a synchronous vibration signal having a frequency equal to the instantaneous rotational frequency of the rotor;
- a detector which measures a vibration vector, the vibration vector comprising amplitude and phase values for the synchronous vibration signal; and
- a processor which records the vibration vector and measures rotor unbalance based upon the recorded vibration vector.

9. The system of claim 8, wherein the dectector measures a plurality of vibration vectors, each vector corresponding to one of a plurality of revolutions of the rotor; and wherein the processor determines an average vibration vector from the plurality of recorded vectors.

10. The system of claim 9, wherein the processor determines the average vibration vector by:
- calculating x and y components for each recorded vector, wherein the x-component of each vector comprises the amplitude of the vector multiplied by the cosine of the vector phase angle, and wherein the y-component of each vector comprises the amplitude of the vector multiplied by the sine of the vector phase angle;
- determining the sums of the x and y components of the recorded vectors to produce x and y component sums, X and Y;
- determining an average amplitude value from the x and y component sums, where the average amplitude, $A(avg.)$, is $1/n^* (X^2+Y^2)^{1/2}$, where n is the number of recorded vectors; and
- determining an average vector phase angle value from the x and y component sums, where the average vector phase angle is $\cos^{-1}(X/[X^2+Y^2]^{1/2})$, where $Y \$ 0$, and $2B-\cos^{-1}(X/[X^2+Y^2]^{1/2})$, where $Y<0$.

11. The system of claim 9, wherein the detector measures and records at least about 100 vectors.

12. The system of claim 8, wherein the processor determines a location for and amount of correction weights to be added to or removed from the rotor to reduce the detected rotor unbalance.

13. The system of claim 8, wherein the processor measures rotor unbalance by determining the existence and location of a rotor anomaly.

14. The system of claim 13, wherein the anomaly comprises a crack.

* * * * *

UNITED STATES PATENT AND TRADEMARK OFFICE
CERTIFICATE OF CORRECTION

PATENT NO. : 6,904,371 B2  Page 1 of 1
APPLICATION NO. : 10/426246
DATED : June 7, 2005
INVENTOR(S) : H. Eric Sonnichsen and Borislav Milatovic It is certified that error appears in the above-identified patent and that said Letters Patent is hereby corrected as shown below:

Column 12
Line 47, claim 3, replace "vector multi" with --vector multiplied by--
Line 56, claim 3, replace "A(avg.), is1/n*(X2+Y2)½, where" with
 --$A_{(avg)}$, is $1/n*(X^2 + Y^2)^{1/2}$, where--
Line 60, claim 3, replace "cos–1 (X/[X2+Y2]½), where Y $ 0," with
 --$\cos^{-1}(X/[X^2 + Y^2]^{1/2})$, where $Y \geq 0$,--
Line 61, claim 3, replace "2B-cos-1 (X/[X2 +Y2]½)" with
 --$2\pi - \cos^{-1}(X/[X^2 + Y^2]^{1/2})$--

Column 13
Line 25, claim 9, replace "wherein the dectector" with --wherein the detector--

Column 14
Line 13, claim 10, replace "A(avg.), is1/n*(X2+Y2)½, where" with
 --$A_{(avg.)}$, is $1/n*(X^2 + Y^2)^{1/2}$, where--
Line 17, claim 10, replace "cos–1 (X/[X2+Y2]½), where Y $ 0," with
 --$\cos^{-1}(X/[X^2+Y^2]^{1/2})$, where $Y \geq 0$,--
Line 18, claim 10, replace "2B–cos–1 (X/[X2+Y2]½)" with
 --$2\pi - \cos^{-1}(X/[X^2 + Y^2]^{1/2})$--

Signed and Sealed this

Twenty-sixth Day of September, 2006

JON W. DUDAS
*Director of the United States Patent and Trademark Office*